Jan. 15, 1963  R. R. SOUTHER  3,072,990
SAFETY PIN
Filed Aug. 2, 1961

INVENTOR.
ROBERT R. SOUTHER

3,072,990
SAFETY PIN
Robert R. Souther, 1732 Newbridge, San Mateo, Calif.
Filed Aug. 2, 1961, Ser. No. 128,790
2 Claims. (Cl. 24—161)

The present invention relates to safety pins.

An object of the present invention is to provide an improved baby's safety pin which is more quickly attached to a diaper or the like and wherein the fear of sticking the baby or the parent is avoided.

Another object of the present invention is to provide a safety pin of the above type wherein once the pin is clamped in place, it is almost impossible to dislodge and wherein the pin may be fastened with only one hand, permitting the other hand to be used to hold the baby.

Still another object of the present invention is to provide a baby's safety pin of the above type which is so constructed that when in use the baby cannot swallow it and wherein the possibility of sticking the baby or the mother is removed.

Other objects of the present invention are to provide a baby's safety pin bearing the above objects in mind which is of simple construction, has a minimum number of parts, is inexpensive to manufacture, and one which is highly efficient in use.

For other objects and for a better understanding of the invention, reference may be had to the following detailed description, taken in connection with the accompanying drawing, in which.

Figure 1:
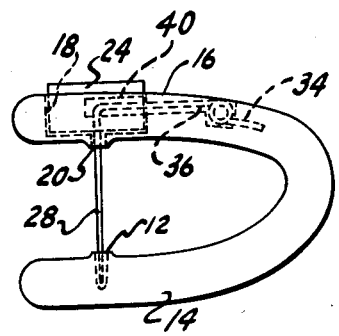
FIG. 1 is a side elevational view of the safety pin of the present invention.
Figure 3:
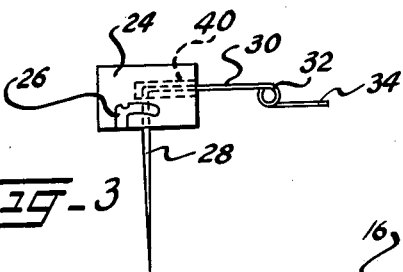
FIG. 3 is a side elevational view of the pin and head portion.
Figure 4:
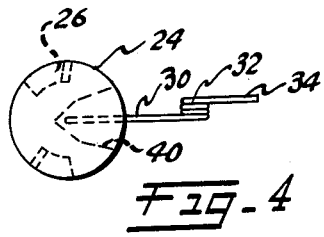
FIG. 4 is a top plan view of the assembly of FIG. 3.
Figure 2:
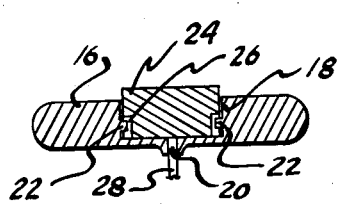
FIG. 2 is a sectional view of the head portion of the pin, on an enlarged scale, with the pin broken away.
Figure 5:
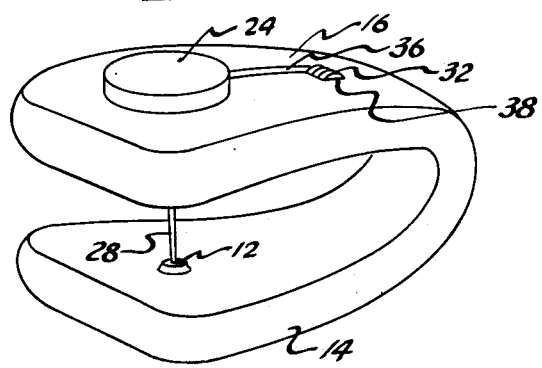
FIG. 5 is an isometric view of the safety pin of the present invention, on an enlarged scale.

Referring in detail to the drawing, the safety pin of the present invention consists in a substantially U-shaped member defining spaced-apart lower and upper legs 14 and 16, respectively, and having a bore 12 on the inner face of lower leg 14, the contour of this member being shown in FIGS. 1 and 5.

The upper leg 16 has on its outer face a recess 18, circular in shape and extending substantially the full thickness of the leg 16. The bottom of the recess 18 has a concentrically arranged hole 20 in alignment with the bore 12 in the leg 14. On opposed sides of the recess 18 are pegs 22.

It will be noted that a spring wire pin 28 has a head portion 24 of a size and shape to fit within the recess 18 and having at opposed points of its periphery bayonet slots 26 receiving the pegs 22. The spring wire pin 28 projects from the underface of the head portion 24 and is formed integrally with a handle 30 having several convolutions 32 and an end part 34 imbedded in the leg 16. The handle 30 may be lifted from a groove 36 provided in the outer face of the upper leg 16. One end of the groove 36 is connected in communication with the recess 18 and the other end terminates in a well 38 receiving the convolutions 32.

The head portion 24 constituting a holding means, is provided on its periphery with a recess 40 and the head portion 24 may be rotated about the pin 28 the distance permitted by the travel of the adjacent part of the handle 30 in the recess 40.

In use, the spring wire convolutions 32 bias the pin 28 into normal seating engagement with the bore 12 in the leg 14. At this time, the pegs 22 engage with the bayonet slots 26 so as to retain the head portion 24 in depressed position, as in FIG. 1, with the pin 28 piercing a diaper or the like which is straddled by the legs 14 and 16. When it is desired to unclasp the pin 28 of the present invention, the upper end part of the head portion 24 is grasped by the fingers and rotated so as to free the pegs 22 from the bayonet slots 26 and permit lifting of the head portion 24 out of the recess 18 a distance permitted by winding of the convolutions 32. This frees the pin 28 from the bore 12 and permits the insertion or withdrawal of a diaper of other fabric portion from between the legs 16 and 14.

Although I have shown and described a preferred embodiment of my safety pin, I do not desire to be limited thereto, but desire to be afforded the full scope of the following claims.

What is claimed is:
1. In a safety pin of the character described:
(a) a substantially U-shaped member defining spaced-apart lower and upper legs between which a diaper or the like may be inserted for a pinning operation;
(b) the upper leg having an outer face in which a recess is fashioned, and this leg being provided with a hole extending downwardly therethrough from the bottom of the recess;
(c) a spring wire pin extending through the hole in the upper leg and projecting toward the lower leg;
(d) the lower leg having an inner face formed with a bore positioned to receive a lower end of the pin, when the latter is depressed to pierce the diaper or the like which is straddled by the legs;
(e) the pin having a spring wire handle formed integrally with an upper end of the pin, and this handle having an end part imbedded in the upper leg;
(f) the handle being formed with convolutions biased to project the lower end of the pin into the bore of the lower leg;
(g) a head portion rotatably disposed in the recess of the upper leg, and being provided with a peripheral recess through which the handle extends, with this peripheral recess having sufficient lateral width so that the head portion may be partially rotated about the pin;
(h) the head portion being depressible in the recess of the upper leg, and engaging with the handle so as to move the pin to pierce the diaper or the like upon being depressed; and
(i) interengaging means on the upper leg and the head portion to retain the latter in depressed position, when the head portion is pressed downwardly and rotated about the pin so as to hold the pin in piercing relation with the diaper or the like.
2. The safety pin, as set forth in claim 1, and in which:
(j) the outer face of the upper leg is provided with a well in which the convolutions of the spring wire handle are accommodated;
(k) this face of the upper leg further being provided with an open groove extending from the well to the recess in the upper leg in which the spring handle is removably disposed, whereby the head portion may be lifted out of this recess to free the pin from the diaper or the like.

References Cited in the file of this patent
UNITED STATES PATENTS

| | | |
|---|---|---|
| 2,501,754 | Battiste | Mar. 28, 1950 |
| 2,644,211 | Summer | July 7, 1953 |
| 2,667,676 | Sampson | Feb. 2, 1954 |
| 2,671,256 | Duke | Mar. 9, 1954 |
| 2,833,013 | Nonaka | May 6, 1958 |